US009086554B2

(12) United States Patent
Scea et al.

(10) Patent No.: US 9,086,554 B2
(45) Date of Patent: Jul. 21, 2015

(54) DUST COVER DESIGN FOR OPTICAL TRANSCEIVER

(71) Applicant: International Business Machines Corporation, Armonk, NY (US)

(72) Inventors: Kenneth Scea, Poughkeepsie, NY (US); Sha Sha Yang, Pasir Ris (SG)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 210 days.

(21) Appl. No.: 13/829,041

(22) Filed: Mar. 14, 2013

(65) Prior Publication Data

US 2014/0270679 A1    Sep. 18, 2014

(51) Int. Cl.
*G02B 6/38* (2006.01)
*G02B 6/42* (2006.01)

(52) U.S. Cl.
CPC ............ *G02B 6/4292* (2013.01); *G02B 6/3849* (2013.01); *G02B 6/4246* (2013.01)

(58) Field of Classification Search
CPC .. G02B 6/3825; G02B 6/3849; G02B 6/3893; G02B 6/4246; G02B 6/4292; G02B 6/4293
USPC ................ 385/76, 86–94, 139; 398/135, 139; 455/90.3
See application file for complete search history.

(56) References Cited

U.S. PATENT DOCUMENTS

| | | | |
|---|---|---|---|
| 1,941,292 A * | 12/1933 | Deckel et al. ................ | 396/473 |
| 3,229,093 A * | 1/1966 | Trautvetter .................. | 250/351 |
| 5,767,999 A * | 6/1998 | Kayner ........................ | 398/164 |
| 6,811,318 B1 | 11/2004 | Hollis et al. | |
| 7,340,146 B2 * | 3/2008 | Lampert et al. ............. | 385/139 |
| 7,448,810 B2 * | 11/2008 | Ko ............................... | 385/92 |
| 7,542,732 B2 * | 6/2009 | Ka ............................... | 455/90.3 |
| 7,661,887 B2 * | 2/2010 | Nakagawa ................... | 385/70 |

FOREIGN PATENT DOCUMENTS

| | | | | |
|---|---|---|---|---|
| CN | 201152498 Y | * | 11/2008 | ............. F21V 14/08 |
| JP | 10096974 A | * | 4/1998 | ............. G03B 9/10 |

OTHER PUBLICATIONS

Braga, Matthew, How Your DSLR Camera Lens' Aperture Really Works, http://www.tested.com/tech/photography/2286-how-your-dslr-camera-lens-aperture-really-works/, May 9, 2011, 6 pages.

* cited by examiner

*Primary Examiner* — Daniel Petkovsek
(74) *Attorney, Agent, or Firm* — Kunzler Law Group (57) ABSTRACT

A dust cover includes a frame shaped to circumscribe an end of a first connector configured to receive a second connector. The connectors can transmit a signal when coupled. A plurality of segments is rotatably coupled to the frame. The frame includes an opening sized to accommodate the second connector. The segments are operable between an open position and closed position. Each segment includes a flexible material and each segment is positioned around the opening and is coupled to the frame at a pivot point. The segments are shaped to cover the opening in the closed position and to expose at least a portion of the opening in the open position. An actuator is rotatably coupled to each segment. Movement of the actuator in a first direction moves the segments to the open position and movement of the actuator in a second direction moves the segments to a closed position.

20 Claims, 9 Drawing Sheets

DUST COVER DESIGN FOR OPTICAL TRANSCEIVER

FIELD

The subject matter disclosed herein relates to dust covers and more particularly relates to a dust cover for an optical transceiver.

BACKGROUND

Description of the Related Art

To prevent contamination and signal integrity issues, current optical transceiver designs rely primarily on a dust cover for protection. Human error, such as forgetting to put the dust cover on the transceiver might cause an accidental exposure to laser light or a dusty port.

BRIEF SUMMARY

A dust cover apparatus includes a frame shaped to circumscribe an end of a first connector. The first connector is configured to receive a second connector. The first and second connectors are configured to transmit a signal when the first and second connectors are in a coupled position. The dust cover apparatus includes a plurality of segments rotatably coupled to the frame. The frame includes an opening. The opening is sized to accommodate the second connector. The plurality of segments is operable between an open position and a closed position. Each segment includes a flexible material and each segment is positioned around the opening and is coupled to the frame at a pivot point. The plurality of segments is shaped to cover the opening when in the closed position and to expose at least a portion of the opening when in the open position. The dust cover apparatus includes an actuator rotatably coupled to each segment of the plurality of segments. Movement of the actuator in a first direction from a first position to a second position moves the plurality of segments to the open position and movement of the actuator in a second direction from the second position to the first position moves the plurality of segments to the closed position where the first direction is opposite the second direction.

In one embodiment, each segment of the plurality of segments rotates in a direction that is substantially within a common plane. In another embodiment, the frame, the plurality of segments, and/or the actuator are shaped and positioned to cover the end of the first connector when the plurality of segments is in the closed position. In another embodiment, when the plurality of segments is in the closed position, the frame, the plurality of segments, and/or the actuator are shaped and positioned to substantially prevent dust from passing to the end of the first connector. In another embodiment, the frame is shaped to be removable from the first connector.

In one embodiment, each segment of the plurality of segments includes a slot and the actuator includes a plurality of posts. Each post is positioned within a slot of a segment so that rotating the actuator rotates the posts and the slot in a segment is shaped to apply a force to rotate the segment responsive to rotation of the actuator. In another embodiment, each segment of the plurality of segments includes a post and the actuator includes a plurality of slots where each post is positioned within a slot of the actuator and rotating the actuator rotates the slots and each slot in the actuator is shaped to apply a force to rotate the segment responsive to rotation of the actuator. In a further embodiment, each slot includes a first end and a second end where the first end is closer to a center of the opening than the second end and the first end and the second end are radially offset such that the slot is angled with respect to a radius from a center of the opening.

In one embodiment, each segment of the plurality of segments overlaps at least a portion of one other segment of the plurality of segments. In another embodiment, each segment of the plurality of segments overlaps at least a portion of one other segment of the plurality of segments in the closed position. In another embodiment, each segment of the plurality of segments overlaps at least a portion of one other segment of the plurality of segments in the open position. In another embodiment, the flexible material of each segment allows the second connector to be coupled with the first connector while the plurality of segments is in the closed position. In another embodiment, the plurality of segments is shaped to form a circular opening coincident to the opening of the frame when the plurality of segments is in the open position.

In one embodiment, the plurality of segments is shaped to form an opening in a shape similar to at least a portion of the second connector and is coincident to the opening of the frame when the plurality of segments is in the open position or a position between the open position and the closed position. In another embodiment, the apparatus includes a spring return mechanism coupled to the actuator that applies a force to the actuator to move the actuator in the second direction and to return the plurality of segments to the closed position after another force moves the actuator in the first direction. In a further embodiment, the spring return mechanism applies a force to move the actuator in the second direction after another force moves the actuator in the first direction and after the second connector is coupled to the first connector. In the embodiment, at least a portion of the plurality of segments engages the second connector.

A dust cover system includes a first connector configured to receive a second connector, where the first and second connectors are configured to transmit a signal when the first and second connectors are in a coupled position. The system includes a frame shaped to circumscribe an end of the first connector and a plurality of segments rotatably coupled to the frame. The frame includes an opening where the opening is sized to accommodate the second connector. The plurality of segments is operable between an open position and a closed position and each segment includes a flexible material. Each segment is positioned around the opening and is coupled to the frame at a pivot point. The plurality of segments is shaped to cover the opening when in the closed position and to expose at least a portion of the opening when in the open position. The system includes an actuator rotatably coupled to each segment of the plurality of segments. Movement of the actuator in a first direction from a first position to a second position moves the plurality of segments to the open position and movement of the actuator in a second direction from the second position to the first position moves the plurality of segments to the closed position where the first direction is opposite the second direction.

In one embodiment, the system includes a signal processing device. The connection is connected to the signal processing device. In another embodiment, the signal processing device includes a computing device with a processor. In another embodiment, the system includes cabling between the first connector and the signal processing device where the cabling transmits signals from the first connector to the signal processing device.

Another embodiment of a dust cover apparatus includes a frame shaped to circumscribe an end of a first connector. The first connector is configured to receive a second connector and the first and second connectors are configured to transmit a signal when the first and second connectors are in a coupled position. The apparatus includes, in one embodiment, a plurality of segments rotatably coupled to the frame and the frame includes an opening where the opening is sized to accommodate the second connector. The plurality of segments is operable between an open position and a closed position and each segment includes a flexible material. Each segment is positioned around the opening and is coupled to the frame at a pivot point. The plurality of segments is shaped to cover the opening when in the closed position and to expose at least a portion of the opening when in the open position. Each segment of the plurality of segments rotates in a direction that is substantially within a common plane and each segment of the plurality of segments overlaps at least a portion of one other segment of the plurality of segments in the open position.

In the embodiment, the apparatus includes an actuator rotatably coupled to each segment of the plurality of segments. Movement of the actuator in a first direction from a first position to a second position moves the plurality of segments to the open position and movement of the actuator in a second direction from the second position to the first position moves the plurality of segments to the closed position where the first direction is opposite the second direction. The frame, the plurality of segments, and the actuator are shaped and positioned to cover the end of the first connector when the plurality of segments is in the closed position and to substantially prevent dust from passing to the end of the first connector. The frame is removable from the first connector. In one embodiment, each segment of the plurality of segments includes a slot and the actuator includes a plurality of posts where each post is positioned within a slot of a segment. Rotating the actuator rotates the posts and the slot in a segment is shaped to apply a force to rotate the segment responsive to rotation of the actuator. In another embodiment, each segment of the plurality of segments includes a post and the actuator includes a plurality of slots where each post is positioned within a slot of the actuator and rotating the actuator rotates the slots and each slot in the actuator is shaped apply a force to rotate the segment responsive to rotation of the actuator.

BRIEF DESCRIPTION OF THE DRAWINGS

In order that the advantages of the embodiments of the invention will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION OF THE INVENTION

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

The schematic flowchart diagrams and/or schematic block diagrams in the Figures illustrate the architecture, functionality, and operation of possible implementations. It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Although various arrow types and line types may be employed in the flowchart and/or block diagrams, they are understood not to limit the scope of the corresponding embodiments. Indeed, some arrows or other connectors may be used to indicate only an exemplary logical flow of the depicted embodiment.

The description of elements in each figure may refer to elements of proceeding figures. Like numbers refer to like elements in all figures, including alternate embodiments of like elements.

Figure 1:
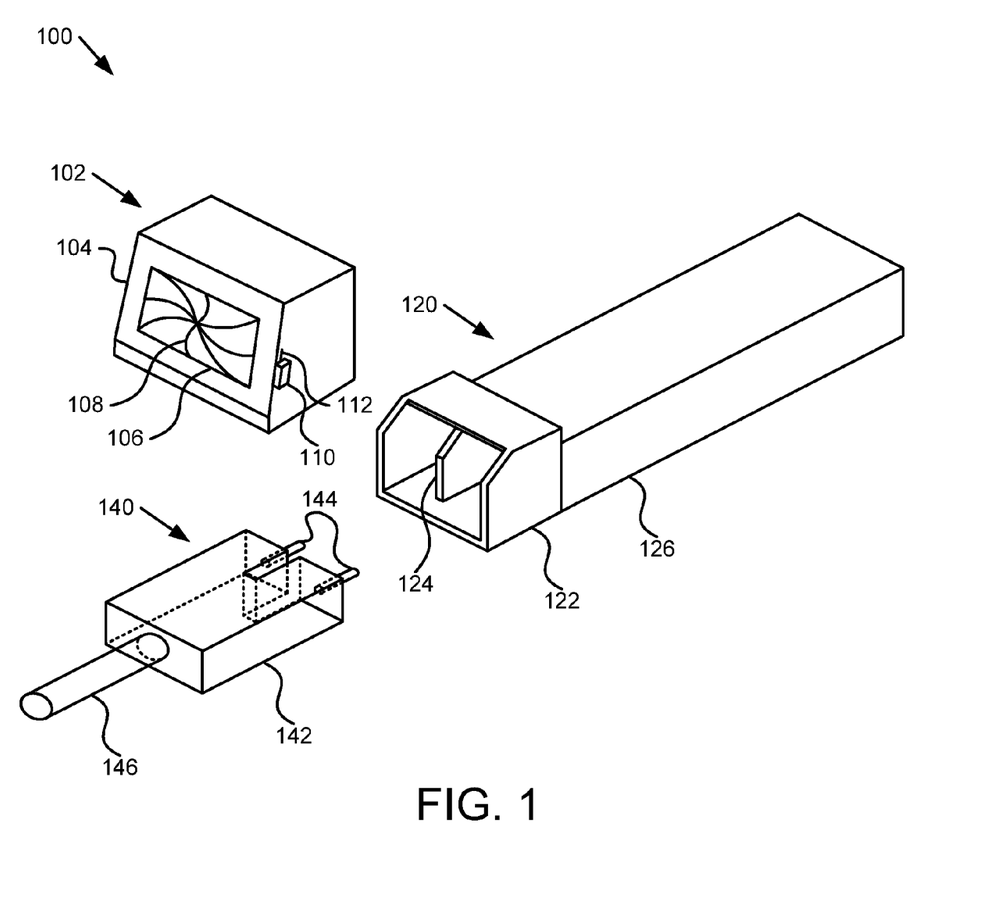
FIG. 1 is a perspective view illustrating one embodiment of an apparatus with a dust cover for a connector in accordance with one embodiment of the present invention.

FIG. 1 is a perspective view illustrating one embodiment of an apparatus 100 with a dust cover for a connector in accordance with one embodiment of the present invention. The apparatus 100 includes a dust cover 102 for a first connector 120, and a second connector 140, which are described below.

The apparatus 100, in one embodiment, includes a dust cover 102 with a frame 104 with an opening 106 and a plurality of segments 108 covering the opening 106. The frame 104, in one example, is shaped to circumscribe an end of the first connector 120. The first connector 120 is configured to receive the second connector 140. The first and second connectors 120, 140 are configured to transmit a signal when the first and second connectors 120, 140 are in a coupled position. For example, the first connector 120 may be an optical transceiver and the dust cover 102 helps to keep the optical transceiver from getting contaminated with dust and other debris and helps to keep laser light from being emitted from the optical transceiver. In another embodiment, the first connector 120 is an outlet for a wired signal bearing medium, such as an Ethernet port with an RJ45 jack. The dust cover 102 may be used for any type of connector that would benefit from a cover to prevent dust and debris.

The depicted first connector 120 is one possible embodiment of a connector. The first connector 120 includes a female receptacle 122 with a divider 124, and a housing 126. The housing 126 with the divider 124 is configured to receive a specific second connector 140 in the form of a male plug. Any form of first connector 120 or second connector 140 may also be used with the dust cover 102 where the first connector 120 or second connector 140 are shaped so that a dust cover 102 may be placed over the connector 120, 140. The female receptacle 122 may have a variety of shapes and sizes. The housing 126 may include connections to an electronic device and may also include electronics for receiving and transmitting a signal, or for transforming or buffering a received signal to another form.

The second connector 140 is configured to mate with the first connector 120 and is configured to transmit a signal. The second connector 140 may include electronics to transform or buffer the signal. The second connector 140 may include a plug body 142 with protrusions 144, such as optical fiber, and a cord 146. The protrusions 144 typically connect to a signal bearing medium in the cord 146 directly or through buffering or transforming electronics in the plug body 142. One of skill in the art will recognize other first and second connector 120, 140 pairs that are suitable for a dust cover.

In one embodiment, the dust cover 102 includes a plurality of segments 108 rotatably coupled to the frame 104. In one embodiment, the opening 106 is sized to accommodate the second connector 140. The segments 108 are operable between an open position and a closed position. In one embodiment, in the closed position the segments 108 cover the opening 106. By closing the segments 108 to cover the opening 106, the dust cover 102 is typically in a condition to substantially prevent dust and debris from passing the dust cover 102 to the first connector 120. In another embodiment, the dust cover 102 closes around another object, such as part of the first connector 120. For example, the first connector 120 may include a guide or other part (not shown) that extends through the opening 106 and the segments 108 close around the guide or part when in the closed position.

In one embodiment, each segment 108 is made of a flexible material. For example, the flexible material may allow the second connector 140 to be pushed through the opening 106 and segments 108 while the segments 108 are in a closed or semi-closed state.

In another embodiment, the flexible material may allow the segments 108 to flex while being retracted to the open state. The segments 108 may be a rubber, a flexible nylon, a flexible plastic, a cloth, or any other flexible material that retains a desired shape but also flexes when inserting the second connector 104, being retracted to the open position, etc. One of skill in the art will recognize other flexible materials suitable for a segment 108 of the dust cover 102.

In one embodiment, each segment 108 is positioned around the opening 106. The segments 108 are typically evenly spaced, but may also be spaced in another configuration that allows coverage of the opening 106 in the closed position. In another embodiment, the segments 108 are each coupled to the frame at a pivot point, which will be discussed in more detail with regards to FIG. 5. The segments 108 are shaped to cover the opening 106 when in the closed position and to expose at least a portion of the opening 106 when in the open position. In one embodiment, the segments 108 are shaped to form a circular opening coincident to the opening 106 of the frame 104 when the segments 108 are in the open position. In other embodiments, the segments 108 form an opening that is larger, smaller, or a different shape than the opening 106. For example, the opening 106 may be square and the segments 108 may form an opening that is round.

The apparatus 100 includes an actuator 110 that is rotatably coupled to each segment 108. In one embodiment, movement of the actuator 110 in a first direction from a first position to a second position moves the segments 108 to the open position and movement of the actuator 110 in a second direction from the second position to the first position moves the segments 108 to the closed position. Typically the first direction is opposite the second direction. In the depicted embodiment, the actuator 110 is a button that moves a lever in a slot 112. In another embodiment, the actuator 110 may be a ring positioned around the opening 106. The actuator 110 may be any mechanism or combination of parts that moves the segments 108 from the first position to the second position.

In one embodiment, the frame 104, the segments 108, and/or the actuator 110 are shaped and positioned to cover the end of the first connector 120 when the segments 108 are in the closed position. In another embodiment, when the segments 108 are in the closed position, the frame 104, the segments 108, and/or the actuator 110 are shaped and positioned to substantially prevent dust from passing to the end of the first connector 120. For example, where the second connector 140 is round, the segments 108 may form a round opening when closed around the second connector 140. In another example, the plug body 142 may not be round but may fit in the frame 104 so that the segments fit around the cord 146, which may be round.

In another embodiment, the segments 108 may be shaped and configured to close in the closed position but may be open in a non-round shape of the second connector 140 when the second connector 140 is coupled to the first connector 120 and the segments 108 may close around a non-round portion of the second connector 140. In another embodiment, the segments 108 are shaped to form an opening in a shape similar to at least a portion of the second connector 140 and coincident to the opening 106 of the frame 104 when the segments 108 are in the open position or a position between the open position and the closed position. In another embodiment, the flexible material of the segments 108 may flex and form around the second connector 140 when the second connector 140 is coupled to the first connector 120. One of skill in the art will recognize other ways for the dust cover 102 to substantially prevent dust from passing to the end of the first connector 120 in the closed position and to fit around the second connector 140 when the second connector 140 is coupled to the first connector 120.

In one embodiment, the dust cover 102 includes a spring return mechanism (not shown) coupled to the actuator 110 that applies a force to the actuator 110 to move the actuator 110 in the second direction and to return the segments 108 to the closed position after another force moves the actuator 110 in the first direction. For example, a user may apply a force to move the actuator 110 to open the segments 108 and then the spring return mechanism may move the actuator 110 so the segments are in the closed position. In another embodiment, the spring return mechanism applies a force to move the actuator 110 in the second direction after opening the segments 108 and also after the second connector 140 is coupled to the first connector 120 so at least a portion of the segments 108 engage the second connector 140. For example, all or a portion of the segments 108 may touch the second connector 140. The segments 108 may also flex when in contact with second connector 140 and the spring return mechanism may apply enough force to flex and engage the second connector 140 to make a better seal around the second connector 140 than if the spring return mechanism was not present. The spring return mechanism may include a spring, elastic material, or other material capable of returning the actuator 110 to the closed position.

In one embodiment, the frame 104 is shaped to be removable from the first connector 120. For example, the frame 104 of the dust cover 102 may be shaped to have a friction fit with the first connector 120. In another embodiment, the frame 104 is screwed to the first connector 120. In another embodiment, the frame 104 is clipped to the first connector 120. One of skill in the art will recognize other ways for the dust cover 102 to removably connect to the first connector 120. In another embodiment, the dust cover 102 is fixed to the first connector 120. For example, the dust cover 102 may include a frame 104 that is molded to or is part of the female receptacle 122, housing 126 or other part of the first connector 120. One of skill in the art will recognize other ways to fix the dust cover 102 to the first connector 120.

Figure 2:
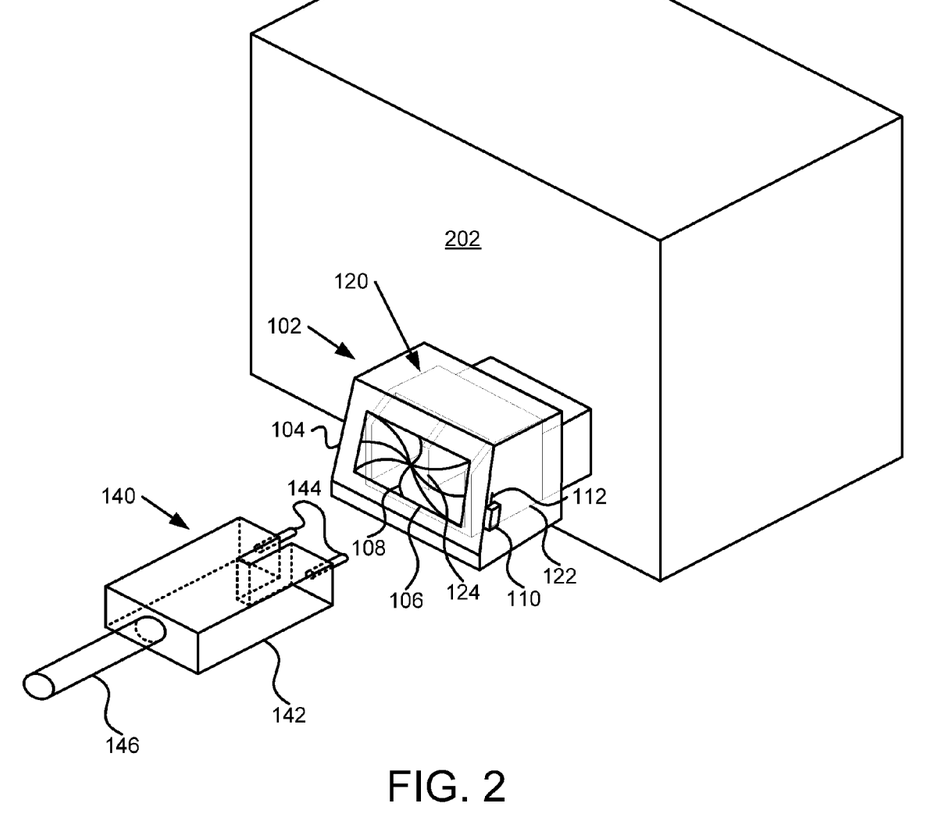
FIG. 2 is a perspective view illustrating one embodiment of a system with a dust cover for a connector in accordance with one embodiment of the present invention.

FIG. 2 is a perspective view illustrating one embodiment of a system 200 with a dust cover for a connector in accordance with one embodiment of the present invention. The system 200 includes a dust cover 102 with a frame 104, an opening 106, a plurality of segments 108, and an actuator 110, a first connector 120 with a female receptacle 122 with a divider 124, and a housing 126, and a second connector 140 with a plug body 142 with protrusions 144, and a cord 146, which are substantially similar to those describe above in relation to the apparatus 100 of FIG. 1. The system 200 also includes a signal processing device 202, which is described below. Typically the dust cover 102 is designed to closely fit around the first connector 120. In one embodiment, the dust cover 102 is shaped specifically for the particular type of first connector 120 that is used.

The dust cover 102 of FIG. 2 is shown covering the end of the first connector 120 and the covered portion of the first connector 120 is shown dashed. The first connector 120 is also shown coupled to a signal processing device 202. For example, the signal processing device 202 may receive or send a signal transmitted through the first and second connectors 120, 140. The signal processing device 202 may be a computing device such as a personal computer, a mainframe, a workstation, and the like, or may be a networking device such as a switch, a router, etc. The signal processing device 202 may be any device where the first connector 120 is installed and would benefit from a dust cover 102 over the first connector 120.

FIGS. 3A-3E are front views illustrating one embodiment of a retractable dust cover 102 in an open position, a partially open position, a half open position, a partially closed position, and a closed position in accordance with one embodiment of the present invention. The FIGS. 3A-3E depict a dust cover 102 with a round design for the opening 106 and segments 108 such that in the open position the segments 108 create a substantially round opening that matches the opening 106 in the frame 104. In the particular embodiment, the actuator 110 is depicted, but may be outside of the frame 104 and accessible or may be internal to the frame 104 and may be operated via a button, such as in FIGS. 1 and 2 or by a lever or other mechanism.

Figure 3A:
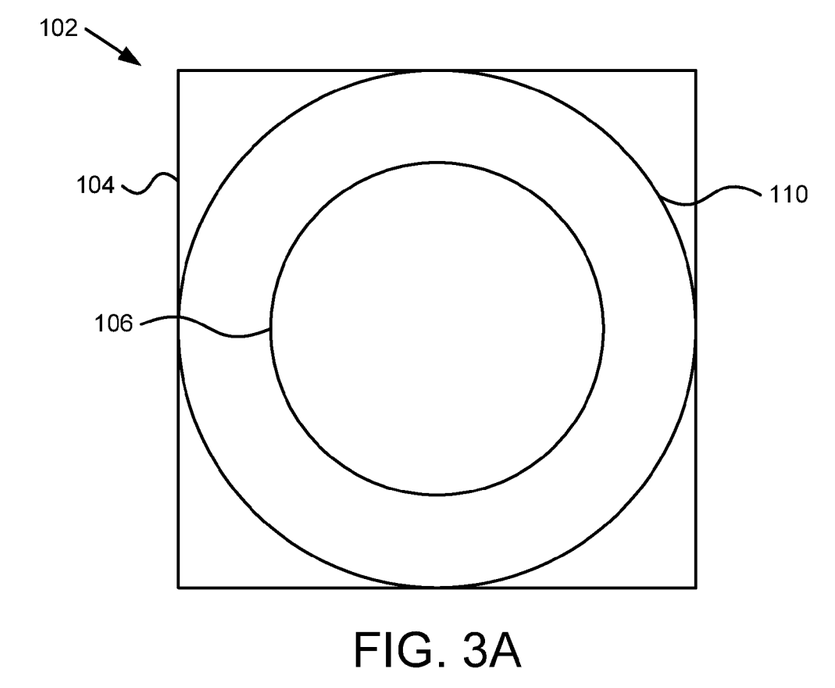
FIG. 3A is a front view illustrating one embodiment of a retractable dust cover in an open position in accordance with one embodiment of the present invention.
Figure 3B:
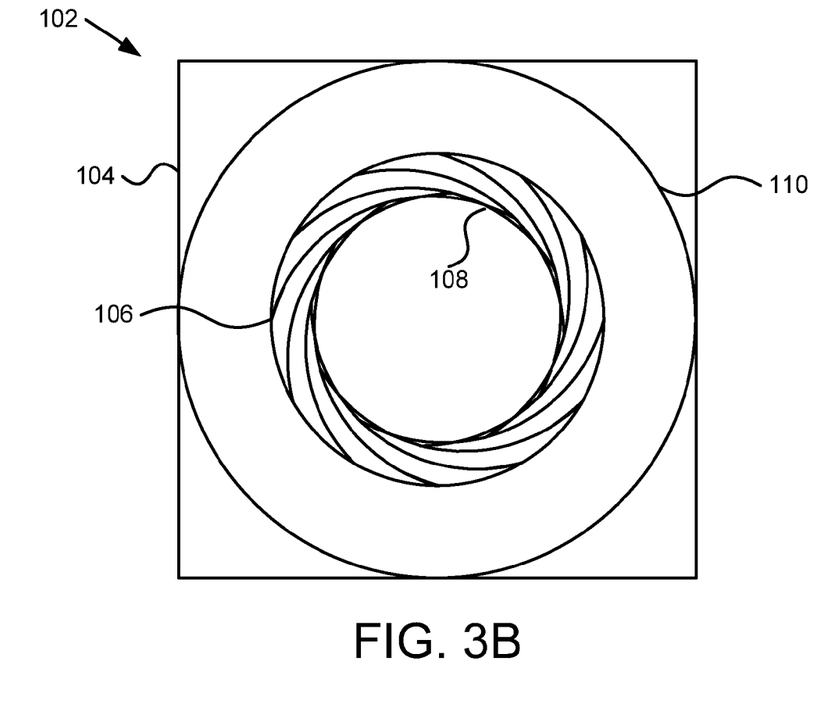
FIG. 3B is a front view illustrating one embodiment of a retractable dust cover in a mostly open position in accordance with one embodiment of the present invention.
Figure 3C:
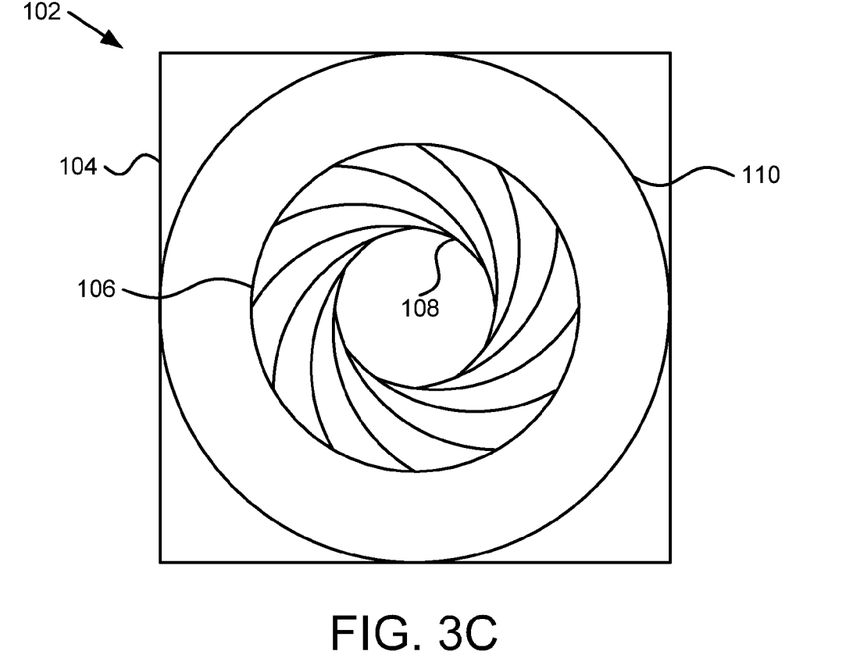
FIG. 3C is a front view illustrating one embodiment of a retractable dust cover in about a half open position in accordance with one embodiment of the present invention.

FIG. 3A depicts an embodiment of the dust cover 102 where the segments 108 are in an open position and not visible. In the open position, the dust cover 102 typically includes an opening 106 sized for the second connector 140 to be inserted and coupled to the first connector 120. The actuator 110 may also include an opening sized similar to or larger than the opening 106 in the frame 104. FIG. 3B depicts the same embodiment of the dust cover 102 as in FIG. 3A where the actuator 110 has rotated the segments 108 to a position where the segments 108 partially block the opening 106 in the frame 104. FIG. 3C depicts the same embodiment of the dust cover 102 as in FIGS. 3A and 3B where the actuator 110 has rotated the segments 108 to a position where the segments 108 partially block the opening 106 in the frame 104 so the segments 108 are about half way open.

Figure 3D:
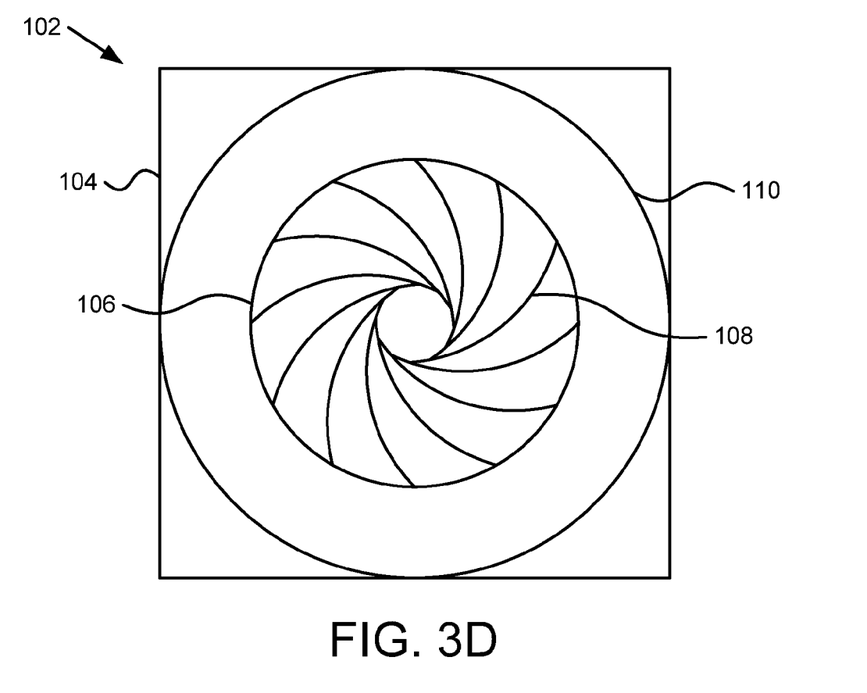
FIG. 3D is a front view illustrating one embodiment of a retractable dust cover in a mostly closed position in accordance with one embodiment of the present invention.
Figure 3E:
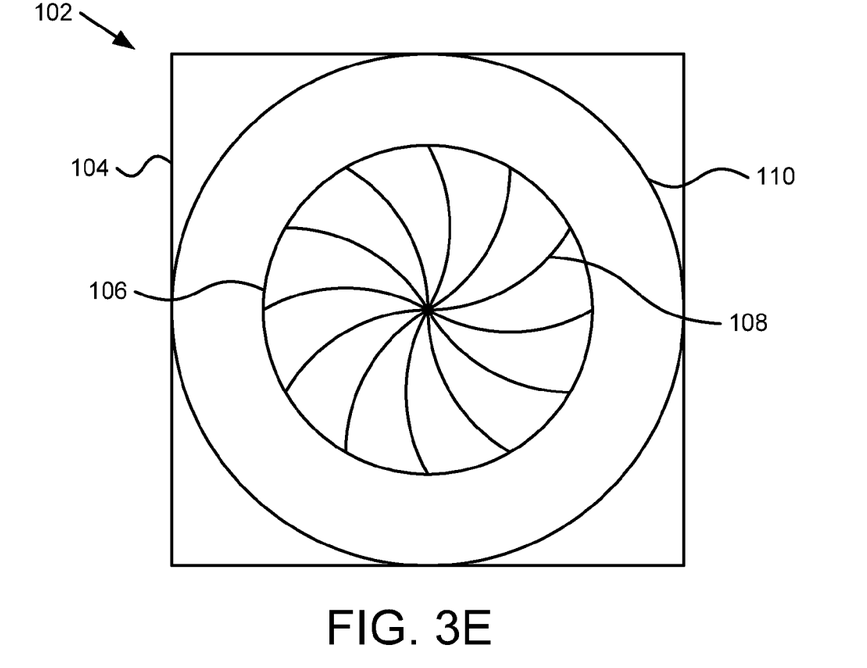
FIG. 3E is a front view illustrating one embodiment of a retractable dust cover in a closed position in accordance with one embodiment of the present invention.

FIG. 3D depicts the same embodiment of the dust cover 102 as in FIGS. 3A-3C where the actuator 110 has rotated the segments 108 to a position where the segments 108 mostly block the opening 106 in the frame 104 so the segments 108 are in a mostly closed position. FIG. 3E depicts the same embodiment of the dust cover 102 as in FIGS. 3A-3D where the actuator 110 has rotated the segments 108 to a position where the segments 108 are in the closed position and block the opening 106 in the frame 104. Typically the segments 108 each have at least a portion overlapping another segment 108 in the closed position, but may also partially overlap each other in the open position.

In one embodiment, each segment 108 rotates in a direction that is substantially within a common plane. One of skill in the art will recognize that due to overlapping of the segments 108, the segments may be slightly out of alignment with the common plane, but move substantially within the common plane. The common plane may be similar to the plane of the actuator 110 and/or face of the frame 104. In another embodiment, the segments 108 are shaped to bend as they retract, for example when the segments 108 encounter an edge of the frame 104, and may only partially move in a common plane. For example, the segments 108 may move in a common plane while in the opening 106 in the frame 104 and may start to bend and deform when reaching a barrier, such as an edge of the frame 104. In another embodiment, the segments 108 may be shaped to retract at an angle different than a common plane but may mate together in the closed position to prevent dust and debris from entering the dust cover 102. One of skill in the art will recognize other ways to form and move segments 108 of the dust cover 102. As mentioned above, in one embodiment the second connector 140 may be inserted through the flexible segments 108 while the segments 108 are in a partially or fully closed position.

Figure 4A:
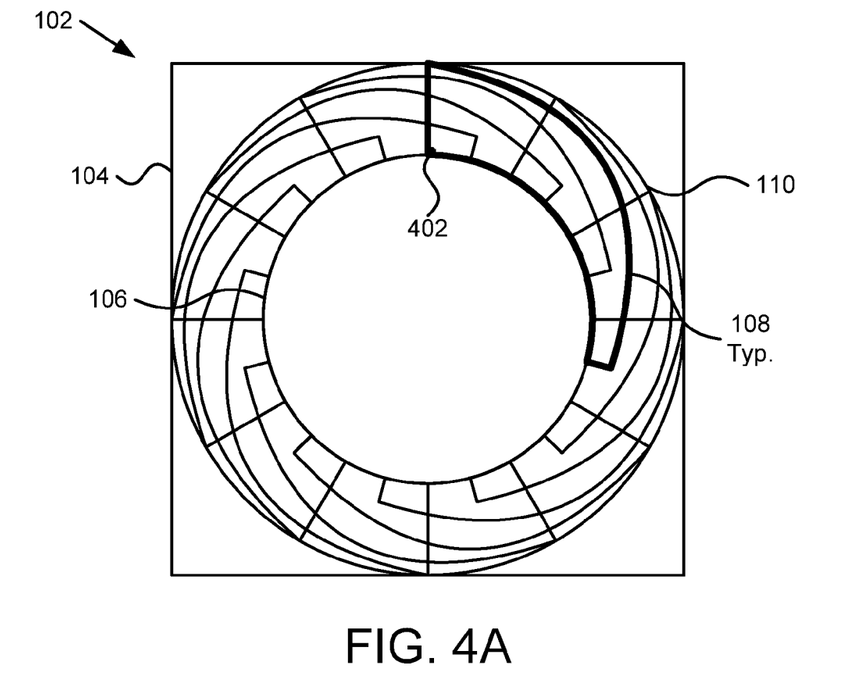
FIG. 4A is a front view illustrating one embodiment of a retractable dust cover in an open position where each leaf is visible in accordance with one embodiment of the present invention.
Figure 4B:
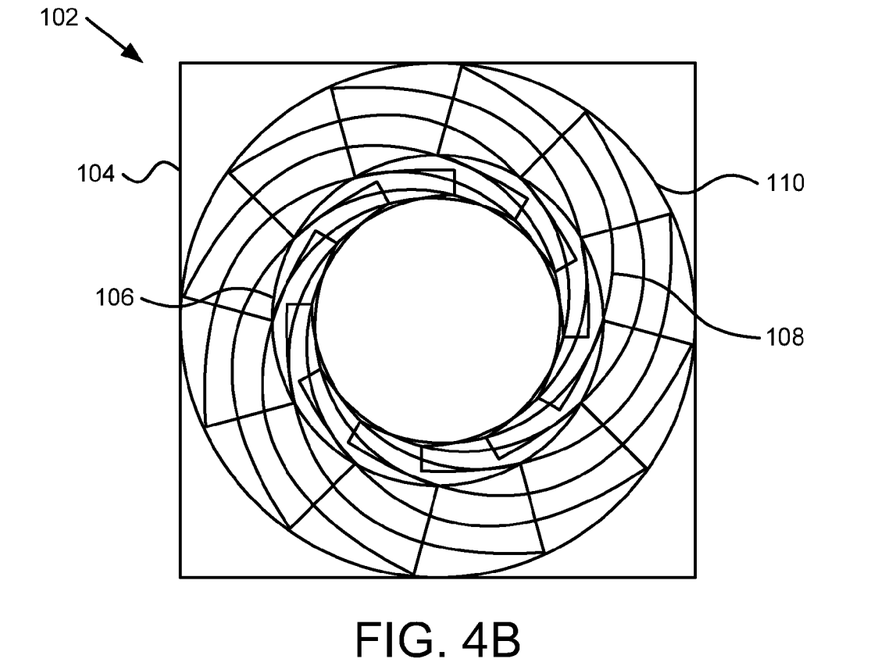
FIG. 4B is a front view illustrating one embodiment of a retractable dust cover in a mostly open position where each leaf is visible in accordance with one embodiment of the present invention.
Figure 4C:
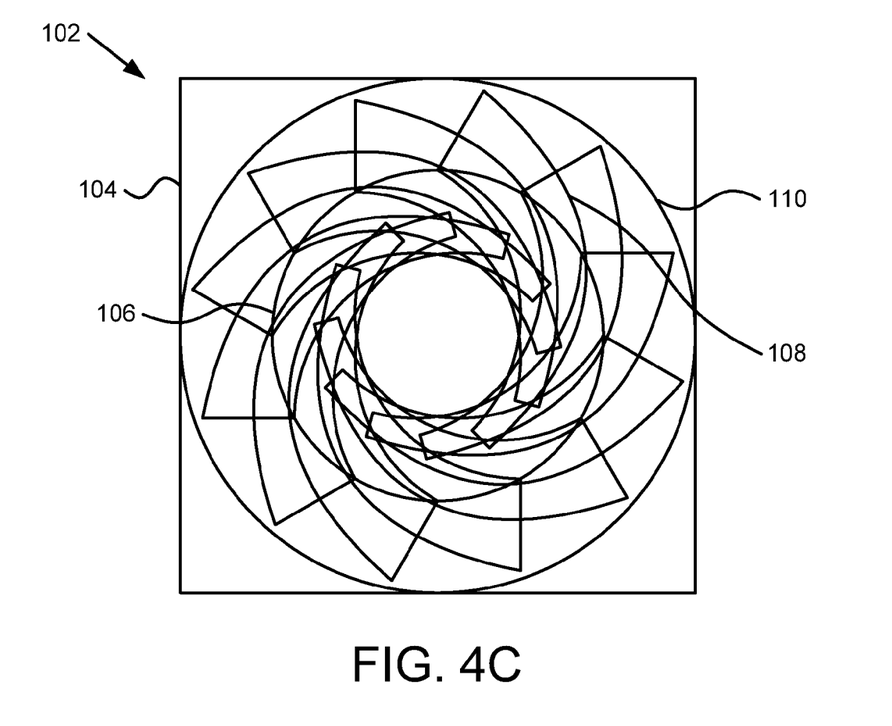
FIG. 4C is a front view illustrating one embodiment of a retractable dust cover in about a half open position where each leaf is visible in accordance with one embodiment of the present invention.
Figure 4D:
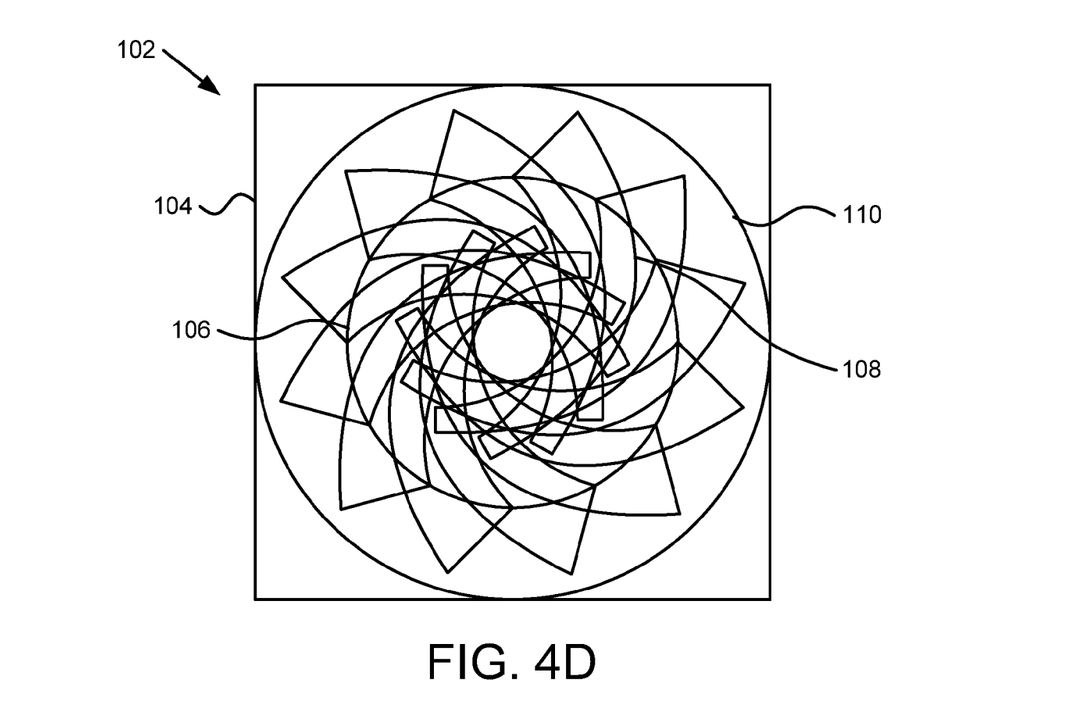
FIG. 4D is a front view illustrating one embodiment of a retractable dust cover in a mostly closed position where each leaf is visible in accordance with one embodiment of the present invention.
Figure 4E:
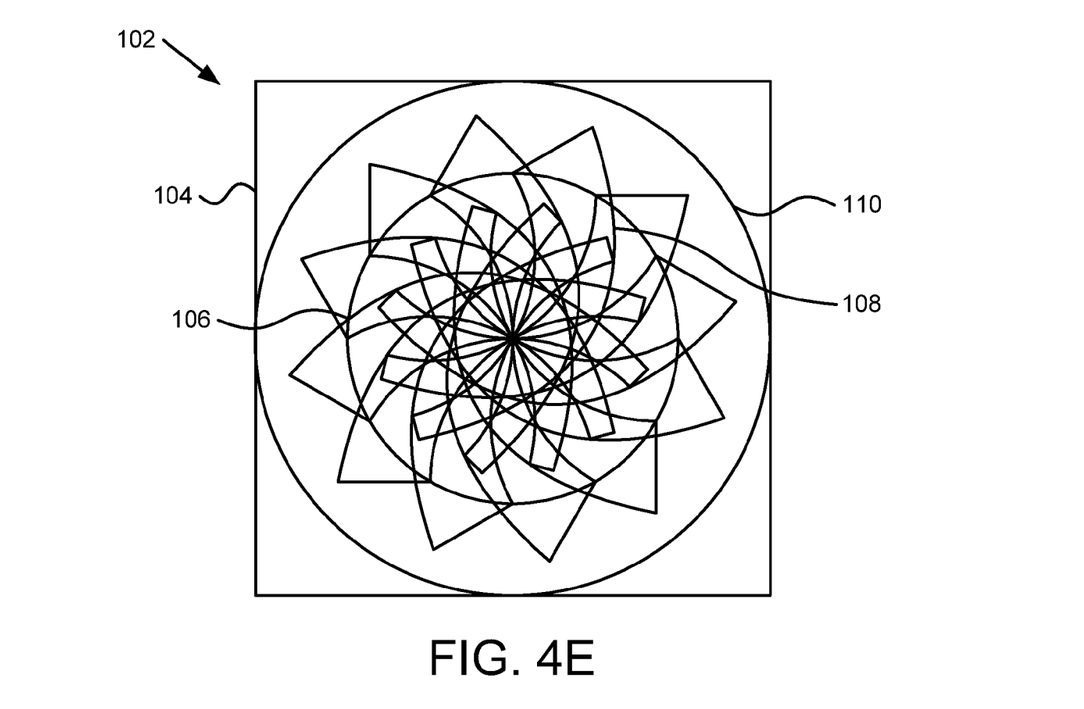
FIG. 4E is a front view illustrating one embodiment of a retractable dust cover in a closed position where each leaf is visible in accordance with an embodiment of the present invention.

FIGS. 4A-4E are front views illustrating one embodiment of a retractable dust cover 102 where each leaf is visible and the dust cover 102 is in an open position, a partially open position, a half open position, a partially closed position, and a closed position in accordance with one embodiment of the present invention. In one embodiment, the dust cover 102 of FIGS. 4A-4E is the same embodiment as depicted in FIGS. 3A-3E. FIGS. 4A-4E depict a dust cover 102 with a round design for the opening 106 and segments 108 such that in the open position the segments 108 create a substantially round opening that matches the opening 106 in the frame 104. In FIG. 4A, one segment 108 is depicted with a darker outline to indicate shape of a segment 108, but it is understood that in the embodiment each segment 108 is shaped substantially the same.

In the particular embodiment, the actuator 110 is depicted, but may again be outside of the frame 104 and accessible and the segments 108 are visible through the actuator 110. In another embodiment, the actuator 110 may be internal to the frame 104 (but visible in FIGS. 4A-4E) and may be operated via a button, such as in FIGS. 1 and 2 or by a lever or other mechanism and the segments 108 are visible through the frame 104 or other cover. In another embodiment, the segments 108 are external to the frame 104 and to the actuator 110. Note that the outline of each segment 108 is visible regardless of whether or not portions of each segment 108 are positioned behind another segment 108. In the embodiment, each segment 108 pivots from a corner 402 of the segment near the opening 106 in the frame 104. (Note that the pivot point 402 is depicted once for clarity but one of skill in the art will recognize that each segment 108 includes a pivot point 402 Various methods of connecting the segments 108 to the actuator 110 are depicted in relation to FIGS. 5 and 6.

Figure 5:
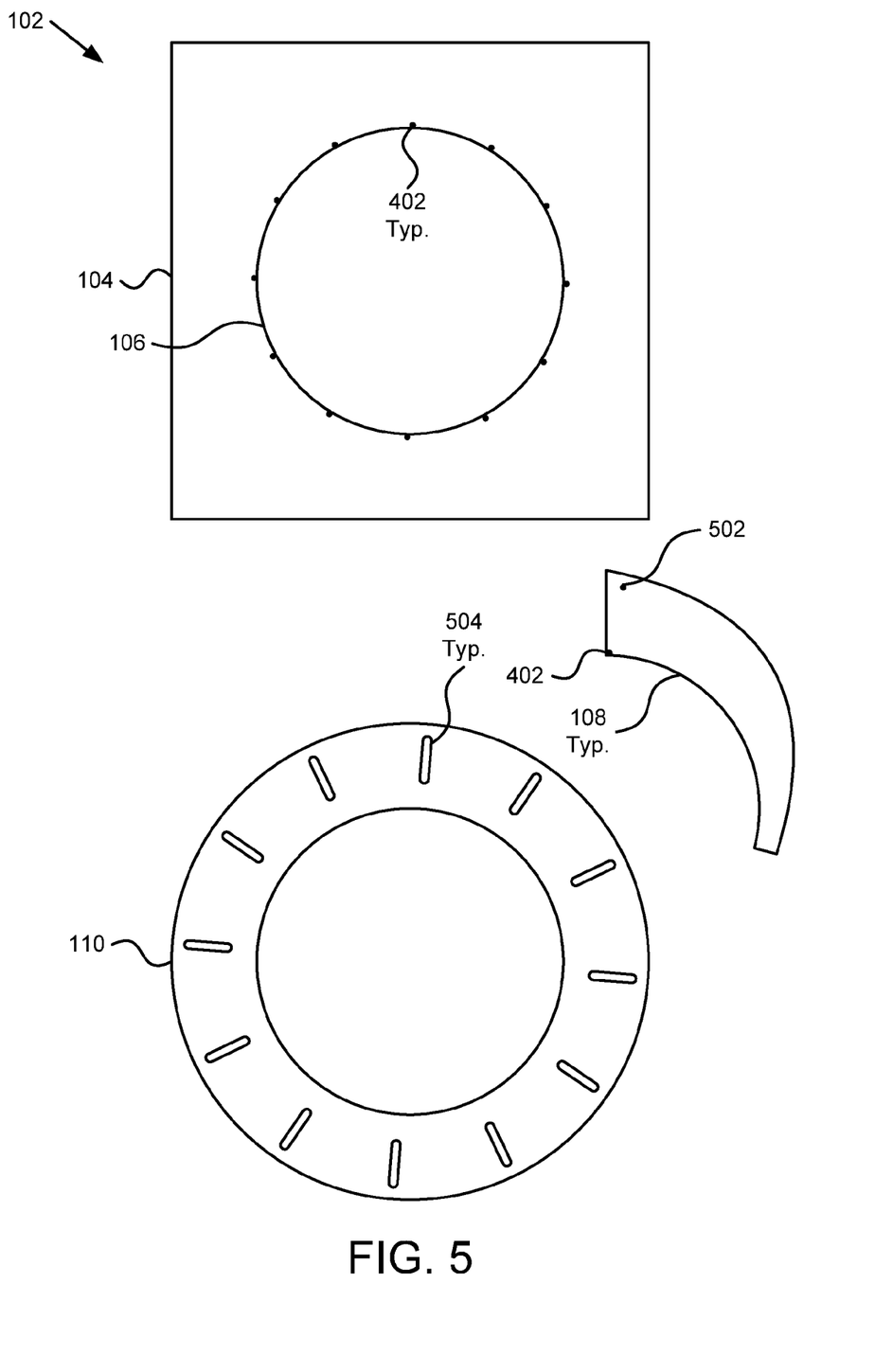
FIG. 5 is a front view illustrating parts of one embodiment of a retractable dust cover including a frame, a segment, and an actuator in accordance with an embodiment of the present invention.

FIG. 5 is a front view illustrating parts of one embodiment of a retractable dust cover 102 including a frame 104, a segment 108, and an actuator 110 in accordance with an embodiment of the present invention. In the embodiment, the frame 104 includes an opening 106 where pivot points 402 are positioned around the opening. One segment 108 is depicted. In one embodiment, each segment 108 of the dust cover 102 is the same. In another embodiment, segments 108 are of different shapes. The depicted segment 108 includes a pivot point 402 in the location as shown, but one of skill in the art will recognize that other designs may have a pivot point 402 in a different position. In other embodiments, one or more segments 108 may not pivot at a single point but may have a more complex motion with appropriate slots, levers, etc. for the complex motion.

In the depicted embodiment, each segment has a post 502 and the actuator 110 includes a slot 504 for the post 502 for each segment 108. In one embodiment, the actuator 110 is rotated clockwise to move apply a force to each post 502 by way of each slot 504 such that each segment 108 rotates clockwise from the open position to the closed position. In the embodiments depicted in FIGS. 3A-3E, 4A-4E, and 5, the design includes 12 segments 108. One of skill in the art will recognize that a dust cover 102 may include more or less segments 108 which are shaped based on the number of segments 108 in the dust cover design.

In the depicted embodiment, the slots 504 are shaped to extend radially from the center of the opening 106. In another embodiment, each slot 504 includes a first end and a second end where the first end is closer to a center of the opening than the second end and the first end and the second end are radially offset such that the slot is angled with respect to a radius from a center of the opening 106. Angling the slots 504 may increase or decrease a distance of travel of the actuator 110, which may or may not be desirable. Changing the angle of the slots 504 may also change the forces on the segments 108. Having a longer distance of travel of the actuator 110 may allow movement of the actuator 110 to be easier for an operator and may reduce speed of movement of the segments 108 and may allow for a finer control of movement of the segments 108. One of skill in the art will recognize tradeoffs between angle of the slots 504, movement of the segments 108, and movement of the actuator 110.

Figure 6:
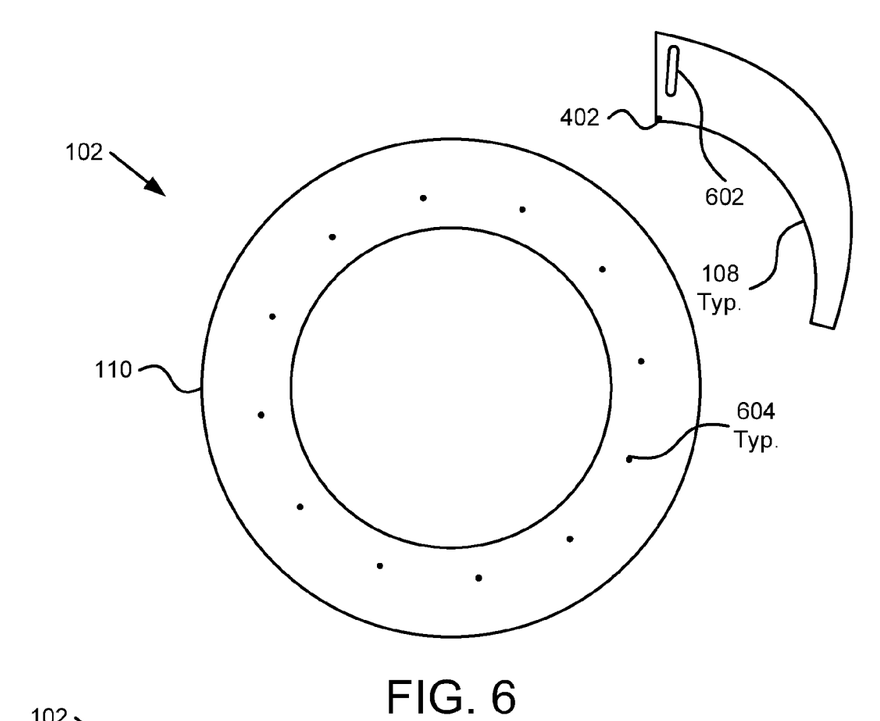
FIG. 6 is a front view illustrating parts of another embodiment of a retractable dust cover including a segment and an actuator in accordance with an embodiment of the present invention.

FIG. 6 is a front view illustrating parts of another embodiment of a retractable dust cover including a segment 108 and an actuator 110 in accordance with an embodiment of the present invention. In the embodiment, the frame 104 may be substantially similar to the frame 104 in FIG. 5. In the embodiment, each segment 108 may include a pivot point 402 and a slot 602 and the actuator 110 includes a post 604. One of skill in the art will recognize other designs of slots 504, 602 and posts 502, 604 of a dust cover 102.

Figure 7:
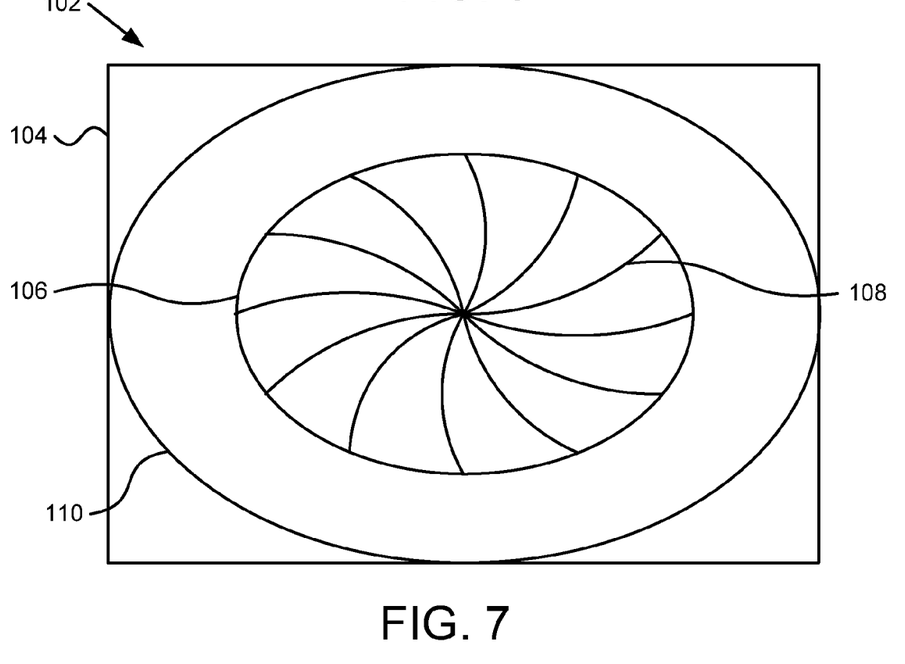
FIG. 7 is a front view illustrating an alternate embodiment of a retractable dust cover in a closed position in accordance with one embodiment of the present invention.

FIG. 7 is a front view illustrating an alternate embodiment of a retractable dust cover 102 in a closed position in accordance with one embodiment of the present invention. In the embodiment, the dust cover 102 includes a frame 104 with an oval shaped opening 106 and actuator 110 and the segments 108 are shaped to accommodate the oval shape of the opening 106 and actuator 110. The actuator 110, in one embodiment, is flexible to move around the oval shape. For example, the actuator 110 may include a chain, a cord, or other similar mechanism that attaches to each segment and the actuator 110 may follow a track around the opening 106. In another embodiment, the actuator 110 is made of a flexible material to change shape as the actuator 110 moves around the opening 106. In another embodiment, the actuator 110 is rigid and changes position as the actuator 110 is rotated. For example the slots 504, 602 and posts 502, 604 of the actuator 110 and segments 108 may be designed for minimal movement of the actuator 110 to move the segments 108 from an open position to a closed position. One of skill in the art will recognize other possible shapes of a frame 104, opening 106, segments 108, and an actuator 110.

The embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
a frame shaped to surround an end of a first connector, the first connector configured to receive a second connector, the first and second connectors configured to transmit a signal when the first and second connectors are in a coupled position;
a plurality of segments rotatably coupled to the frame, the frame comprising an opening, the opening sized to accommodate the second connector, the plurality of segments operable between an open position and a closed position, each segment comprising a flexible material such that the plurality of segments is capable of flexing to conform to the second connector when the second connector is coupled to the first connector, each segment positioned around the opening and coupled to the frame at a pivot point, the plurality of segments shaped to cover the opening when in the closed position and to expose at least a portion of the opening when in the open position; and an actuator rotatably coupled to each segment of the plurality of segments, wherein movement of the actuator in a first direction from a first position to a second position moves the plurality of segments to the open position and movement of the actuator in a second direction from the second position to the first position moves the plurality of segments to the closed position, the first direction opposite the second direction.

2. The apparatus of claim 1, wherein each segment of the plurality of segments rotates in a direction that is substantially within a common plane.

3. The apparatus of claim 1, wherein one or more of the frame, the plurality of segments, and the actuator are shaped and positioned to cover the end of the first connector when the plurality of segments is in the closed position.

4. The apparatus of claim 1, wherein, when the plurality of segments is in the closed position, one or more of the frame, the plurality of segments, and the actuator are shaped and positioned to substantially prevent dust from passing to the end of the first connector.

5. The apparatus of claim 1, wherein the frame is shaped to be removable from the first connector.

6. The apparatus of claim 1, wherein one of:
each segment of the plurality of segments comprises a slot and the actuator comprises a plurality of posts, each post positioned within a slot of a segment, wherein rotating the actuator rotates the posts and wherein the slot in a segment is shaped to apply a force to rotate the segment responsive to rotation of the actuator; and
each segment of the plurality of segments comprises a post and the actuator comprises a plurality of slots, each post positioned within a slot of the actuator, wherein rotating the actuator rotates the slots and wherein each slot in the actuator is shaped apply a force to rotate the segment responsive to rotation of the actuator.

7. The apparatus of claim 6, wherein each slot comprises a first end and a second end wherein the first end is closer to a center of the opening than the second end and wherein the first end and the second end are radially offset such that the slot is angled with respect to a radius from a center of the opening.

8. The apparatus of claim 1, wherein each segment of the plurality of segments overlaps at least a portion of one other segment of the plurality of segments.

9. The apparatus of claim 8, wherein each segment of the plurality of segments overlaps at least a portion of one other segment of the plurality of segments in the closed position.

10. The apparatus of claim 8, wherein each segment of the plurality of segments overlaps at least a portion of one other segment of the plurality of segments in the open position.

11. The apparatus of claim 1, wherein the flexible material of each segment allows the second connector to be coupled with the first connector while the plurality of segments is in the closed position.

12. The apparatus of claim 1, wherein the plurality of segments is shaped to form a circular opening coincident to the opening of the frame when the plurality of segments is in the open position.

13. The apparatus of claim 1, wherein the plurality of segments is shaped to form an opening in a shape similar to at least a portion of the second connector and coincident to the opening of the frame when the plurality of segments is in one of the open position and a position between the open position and the closed position.

14. The apparatus of claim 1, further comprising a spring return mechanism coupled to the actuator that applies a force to the actuator to move the actuator in the second direction and to return the plurality of segments to the closed position after another force moves the actuator in the first direction.

15. The apparatus of claim 14, wherein the spring return mechanism applies a force to move the actuator in the second direction after another force moves the actuator in the first direction and after the second connector is coupled to the first connector, wherein at least a portion of the plurality of segments engages the second connector.

16. A system comprising:
a first connector configured to receive a second connector, the first and second connectors configured to transmit a signal when the first and second connectors are in a coupled position;
a frame shaped to surround an end of the first connector;
a plurality of segments rotatably coupled to the frame, the frame comprising an opening, the opening sized to accommodate the second connector, the plurality of segments operable between an open position and a closed position, each segment comprising a flexible material such that the plurality of segments is capable of flexing to allow the second connector to be coupled with the first connector while the plurality of segments is in the closed position, each segment positioned around the opening and coupled to the frame at a pivot point, the plurality of segments shaped to fully cover the opening when in the closed position and to expose at least a portion of the opening when in the open position; and
an actuator rotatably coupled to each segment of the plurality of segments, wherein movement of the actuator in a first direction from a first position to a second position moves the plurality of segments to the open position and movement of the actuator in a second direction from the second position to the first position moves the plurality of segments to the closed position, the first direction opposite the second direction.

17. The system of claim 16, further comprising a signal processing device, the first connection connected to the signal processing device.

18. The system of claim 17, wherein the signal processing device comprises a computing device with a processor.

19. The system of claim 17, further comprising cabling between the first connector and the signal processing device, wherein the cabling transmits signals from the first connector to the signal processing device.

20. An apparatus comprising:
a frame shaped to surround an end of a first connector, the first connector configured to receive a second connector, the first and second connectors configured to transmit a signal when the first and second connectors are in a coupled position;
a plurality of segments rotatably coupled to the frame, the frame comprising an opening, the opening sized to accommodate the second connector, the plurality of segments operable between an open position and a closed position, each segment comprising a flexible material such that the plurality of segments is capable of flexing to conform to the second connector when the second connector is coupled to the first connector, each segment positioned around the opening and coupled to the frame at a pivot point, the plurality of segments shaped to cover the opening when in the closed position and to expose at least a portion of the opening when in the open position, each segment of the plurality of segments rotates in a direction that is substantially within a common plane, wherein each segment of the plurality of segments overlaps at least a portion of one other segment of the plurality of segments in the open position; and an actuator rotatably coupled to each segment of the plurality of segments, wherein movement of the actuator in a first direction from a first position to a second position moves the plurality of segments to the open position and movement of the actuator in a second direction from the second position to the first position moves the plurality of segments to the closed position, the first direction opposite the second direction, wherein the frame, the plurality of segments, and the actuator are shaped and positioned to cover the end of the first connector when the plurality of segments is in the closed position and to substantially prevent dust from passing to the end of the first connector, the frame being removable from the first connector, wherein one of:

each segment of the plurality of segments comprises a slot and the actuator comprises a plurality of posts, each post positioned within a slot of a segment, wherein rotating the actuator rotates the posts and wherein the slot in a segment is shaped to apply a force to rotate the segment responsive to rotation of the actuator; and each segment of the plurality of segments comprises a post and the actuator comprises a plurality of slots, each post positioned within a slot of the actuator, wherein rotating the actuator rotates the slots and wherein each slot in the actuator is shaped apply a force to rotate the segment responsive to rotation of the actuator.

* * * * *